(12) United States Patent
Nakatsugawa

(10) Patent No.: US 6,243,830 B1
(45) Date of Patent: *Jun. 5, 2001

(54) STATE INFORMATION MANAGING METHOD AND COMMUNICATION SYSTEM

(75) Inventor: Yoshinori Nakatsugawa, Shizuoka-ken (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,980

(22) Filed: May 6, 1998

(30) Foreign Application Priority Data

May 8, 1997 (JP) .................................................. 9-118424

(51) Int. Cl.$^7$ ...................................................... G06F 11/00
(52) U.S. Cl. .............................. 714/15; 714/4; 714/811; 340/825.06; 340/825.07; 370/254
(58) Field of Search .................................. 714/15, 811, 4; 370/254; 340/825.06, 825.07; 713/201; 379/88.06

(56) References Cited

U.S. PATENT DOCUMENTS

| | | | | |
|---|---|---|---|---|
| 4,954,950 | * | 9/1990 | Freeman et al. | 709/228 |
| 5,113,521 | * | 5/1992 | McKeen et al. | 714/15 |
| 5,325,376 | * | 6/1994 | Ushio et al. | 714/811 |
| 5,402,115 | * | 3/1995 | Tanaka | 340/825.06 |
| 5,499,018 | * | 3/1996 | Welmer | 340/825.07 |
| 5,758,053 | * | 5/1998 | Takeuchi et al. | 714/4 |
| 5,781,716 | * | 7/1998 | Hemphill et al. | 714/4 |
| 5,884,025 | * | 3/1999 | Baehr et al. | 713/201 |
| 5,982,856 | * | 11/1999 | Cohn et al. | 379/88.06 |
| 5,991,275 | * | 11/1999 | Abiven et al. | 370/254 |

FOREIGN PATENT DOCUMENTS

| | | |
|---|---|---|
| 62-194759 | 8/1987 | (JP) . |
| 64-24538 | 1/1989 | (JP) . |
| 402054387A | * 2/1990 | (JP) . |
| 3-38784 | 6/1991 | (JP) . |
| 5-145554 | 6/1993 | (JP) . |

* cited by examiner

Primary Examiner—Ayaz Sheikh
Assistant Examiner—Frantz B. Jean
(74) Attorney, Agent, or Firm—Oblon, Spivak, McClelland, Maier & Neustadt, P.C.

(57) ABSTRACT

In a communication system wherein a collecting communication unit of a plurality of communication units collects state information from report communication units to manage the state information, each of the report communication units comprises a state information memory for storing the state information of own communication unit, a state monitoring portion for monitoring the state information of own communication unit and then rewriting the stored state information into new state information after change if the state information has been changed, and a transmitting/receiving portion for adding the stored state information and own address to the recovery command and then transmitting the recovery command when respective report communication units receive the recovery command for recovering the state information, whereby the collecting communication unit can receive the recovery command to which changed state information and their own addresses of respective report communication units are added collectively.

8 Claims, 3 Drawing Sheets

STATE INFORMATION MANAGING METHOD AND COMMUNICATION SYSTEM

BACKGROUND OF THE INVENTION

1. Field of the Invention

The present invention relates to a state information managing method which is able to manage easily state information of respective communication units and also reduce a communication traffic volume required for management of state information in a communication system wherein a plurality of communication units for exchanging data communication mutually are connected to a bus, and a communication system.

2. Description of the Prior Art

In a communication system in which a plurality of communication units are connected to a bus, respective communication units can exchange data communication mutually. At this time, since internal states of respective communication units are changed with the lapse of time, state information indicating the internal states have been managed by the communication units respectively.

As the state information management method, there has been such a method that, when the data management portion issues a state request to respective communication units, such respective communication units transmits a state response to the data management portion in response to the state request from the data management portion. However, according to this method, since the state request and the state response must be issued from respective communication units, an extensive communication traffic volume has been needed.

Therefore, there has been known the first method to reduce the communication traffic volume of the state request. In the first method, once the state request has been issued after a state information collecting destination has been identified clearly, the communication units which receive such state request have transmitted automatically state reports to the state information collecting destination subsequently every time when their states are changed. According to the first method, the communication traffic volume of the state request can be reduced.

However, according to the above first method, if reports of the state information are generated simultaneously from a plurality of communication units, collision of data has occurred. Therefore, for example, a means for avoiding such collision of data must be provided.

In addition, as the second method to reduce the communication traffic volume of the state request, there has been a method set forth in Patent Application Publication (KOKAI) Sho 64-24538, for example. According to this method set forth in Patent Application Publication (KOKAI) Sho 64-24538, the communication controller for sending out information sets a set of address data of own unit and to-be-sent information in the data portion in the certain communication message, and then plural information are sent out in sequence in compliance with procedure of deciding priority order which is decided by the address data. However, in the method set forth in Patent Application Publication (KOKAI) Sho 64-24538, the information request and the information collection are not carried out simultaneously.

Moreover, as the technology of this type in the prior art, there has been a system set forth in Patent Application Publication (KOKAI) Hei 3-38784. The system set forth in Patent Application Publication (KOKAI) Hei 3-38784 is the loop type communication system in which a plurality of communication frames are always circulated in serial.

Still more, the system set forth in Patent Application Publication (KOKAI) Sho 62-194759 is the communication system in which a plurality of nodes are connected like a loop and signals are transmitted in one way. In this communication system, a series of call setting procedures which are constructed by transmitting additional information necessary for call setting request for the transmitter side node issued from the transmitter side node and call setting allowance or call setting refuse and call setting are transmitted via packet transmission.

However, in the system set forth in Patent Application Publication (KOKAI) Sho 62-194759, individual collection is employed but batch collection is not employed. Therefore, according to the system, it has been difficult to reduce the communication traffic volume.

SUMMARY OF THE INVENTION

The present invention has been made in light of the above circumstances, and it is an object of the present invention to provide a state information managing method which is able to manage easily state information of respective communication units and also reduce a communication traffic volume required for management of the state information, and a communication system.

In order to achieve the above object, according to the present invention, there is provided a state information managing method wherein collecting communication unit in a plurality of communication units are able to collect state information indicating respective states from one or more report communication units except the collecting communication unit to manage their state information in a communication system in which the plurality of communication units are connected to a bus to exchange mutual communication, comprising: a state monitoring step of monitoring the state information of own communication unit in respective report communication units, and rewriting the state information stored in a memory portion into new state information after change if the state information in own communication unit has been changed; a transmitting step of transmitting a recovery command for recovering the state information from the collecting communication unit; a transmitting/receiving step of adding the state information stored in the memory portion and own address to the recovery command and then transmitting the recovery command when respective report communication units receive the recovery command; and a receiving step of receiving the recovery command to which changed state information and their own addresses of respective report communication units are added collectively, by the collecting communication unit.

According to the present invention, in respective report communication units, it is monitored whether or not the state information in own communication unit has been changed, then the state information stored in a memory portion is rewritten if the state information has been changed, then the changed state information and own address are added to the recovery command when respective report communication units receive the recovery command, and then the recovery command is transmitted.

Then, after the recovery command has been transmitted to all the report communication units, the collecting communication unit receives the recovery command to which the changed state information and their own addresses of respective report communication units are added collectively.

In other words, since the collecting communication unit can acquire the state information of respective report communication units by receiving the recovery command only once, the communication traffic volume can be reduced and also collision of the state information sent out from respective report communication units can be avoided.

In the preferred embodiment of the present invention, the state monitoring step rewrites the state information stored in the memory portion into new state information after change if the state information of own communication unit is changed, and then sets a report flag added to the memory portion, and the transmitting/receiving step adds the state information stored in the memory portion and their own addresses to the recovery command and then transmits the recovery command if the report flag has been set when respective report communication units receive the recovery command, and then resets the report flag.

In the preferred embodiment of the present invention, the transmitting/receiving step transmits the recovery command received as it is unless the report flag has been set when respective report communication units receive the recovery command.

According to this embodiment, the report flag is set when the state information has been changed and the report flag is reset when the state information and the their own addresses after the change are added to the recovery command, so that it can be grasped whether or not the state information after the change have been recovered. In addition, only the changed state information of the report communication units in which the state information have been changed can be transmitted.

In the preferred embodiment of the present invention, the recovery command includes a source address, a destination address, a command, state information, and own address, and the transmitting/receiving step decides, based on any one of the source address, the destination address, and the command, whether or not received data is the recovery command.

According to this embodiment, based on any one of the source address, the destination address, and the command, it can be decided whether or not the received data is the recovery command.

In order to achieve the above object, according to the present invention, there is provided a communication system wherein a plurality of communication units are connected to a bus to exchange mutual communication and a collecting communication unit can collect state information indicating respective states from one or more report communication units except the collecting communication unit to manage their state information, each of the report communication units comprising: a memory portion for storing the state information in own communication unit; a state monitoring portion for monitoring the state information of own communication unit, and rewriting the state information stored in a memory portion into new state information after change if the state information in own communication unit has been changed; and a first transmitting/receiving portion for adding the state information stored in the memory portion and own address to the recovery command and then transmitting the recovery command when respective report communication units receive the recovery command for recovering the state information; and the collecting communication unit comprising: a second transmitting/receiving portion for transmitting the recovery command to recover the state information and then receiving the recovery command to which changed state information and their own addresses of respective report communication units are added collectively.

In the preferred embodiment of the present invention, the state monitoring portion rewrites the state information stored in the memory portion into new state information after change if the state information of own communication unit is changed, and then sets a report flag added to the memory portion, and the first transmitting/receiving portion adds the state information stored in the memory portion and their own addresses to the recovery command and then transmits the recovery command if the report flag has been set when respective report communication units receive the recovery command, and then resets the report flag.

In the preferred embodiment of the present invention, the first transmitting/receiving portion transmits the recovery command received as it is unless the report flag has been set when respective report communication units receive the recovery command.

In the preferred embodiment of the present invention, the recovery command includes a source address, a destination address, a command, state information, and own address, and the first transmitting/receiving portion decides, based on any one of the source address, the destination address, and the command, whether or not received data is the recovery command.

The nature, principle and utility of the invention will become more apparent from the following detailed description when read in conjunction with the accompanying drawings.

DESCRIPTION OF THE PREFERRED EMBODIMENTS

A state information managing method and a communication system according to an embodiment of the present invention will be explained in detail with reference to the accompanying drawings hereinafter.

Figure 1:
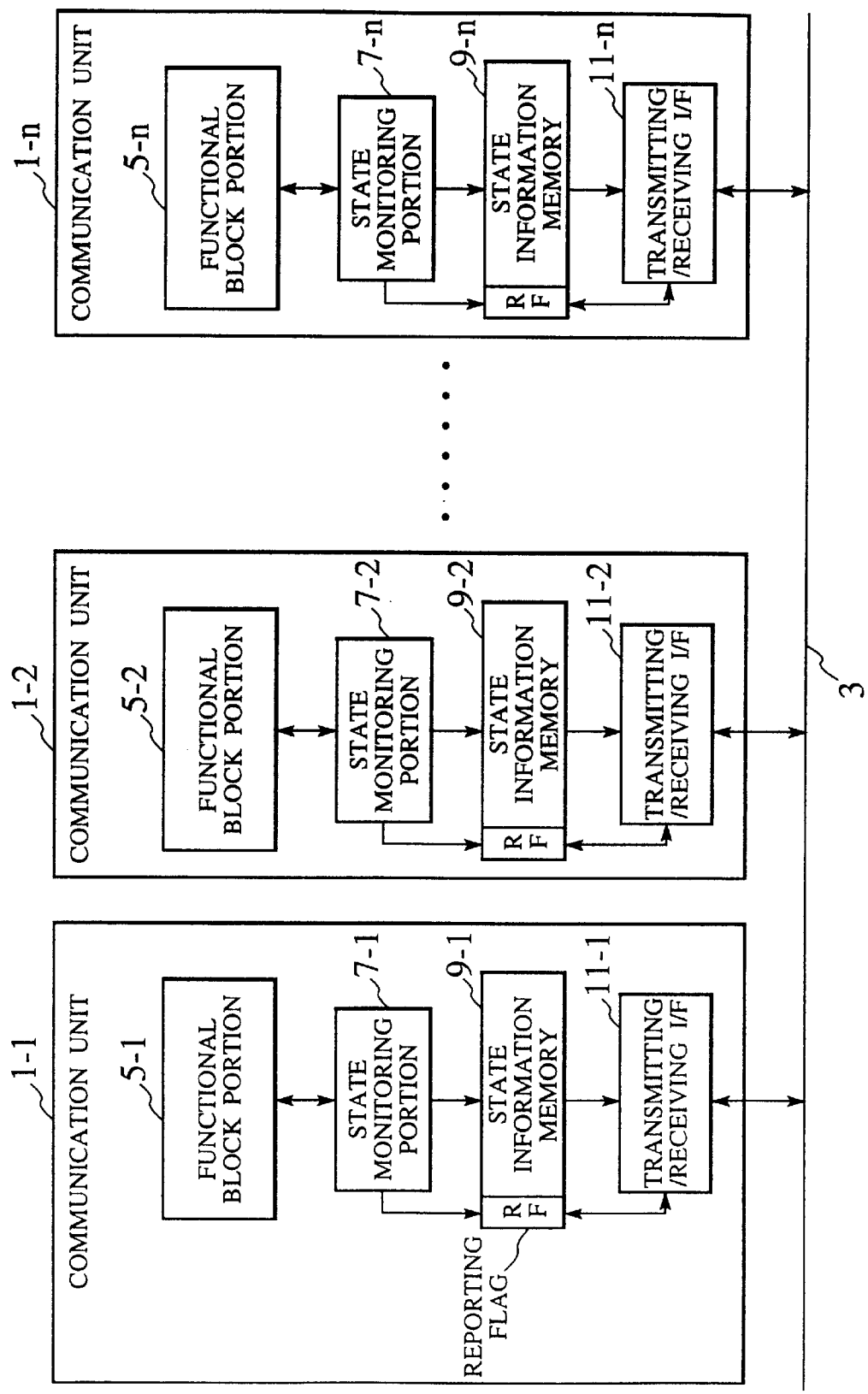
FIG. 1 is a view showing a configuration of a communication system according to an embodiment of the present invention.

FIG. 1 shows a configuration of a communication system according to the embodiment of the present invention. This communication system is constructed such that a plurality of communication units 1-1 to 1-n are connected to a bus 3 so as to exchange data communication mutually.

Respective communication units 1-1 to 1-n comprise functional block portions 5-1 to 5-n, state monitoring portions 7-1 to 7-n, state information memories 9-1 to 9-n, and transmitting/receiving interfaces (transmitting/receiving I/F) 11-1 to 11-n.

For example, the communication units 1-1, 1-3 to 1-15 are report communication units for reporting the state information. The communication unit 1-2 is a collecting communication unit which collects the state information indicating states of respective communication units 1-1, 1-3 to 1-15.

The functional block portions 5-1 to 5-n operate as device functions such as a compact disk (CD) player, a mini disk (MD) player, a digital video disk (DVD) player, etc. and have the state information such as CD data, MD data, DVD data, etc. The state information memories 9-1 to 9-n store report flags RF for reporting change in the state information to the communication unit 1-2 (collecting communication unit).

The state monitoring portions 7-1 to 7-n monitor whether or not the state information of the functional block portions 5-1 to 5-n are changed. When the state information are changed, the state monitoring portions 7-1 to 7-n rewrite the state information stored in the state information memories 9-1 to 9-n and also set the report flag RF to "1".

Upon receiving, from other communication units, the recovery command for recovering the state information of the communication units 1-1, 1-3 to 1-15 to the communication unit 1-2 serving as the collection destination, the transmitting/receiving I/F 11-1 to 11-n reset the report flag stored in the state information memories 9-1 to 9-n, then add the state information and their own addresses stored in the state information memories 9-1 to 9-n to the recovery command, and then transmit them.

The report flag is reset to "0" at initial state. The report flag is set to "1" when the state information is changed and then reset to "0" when the state information is recovered by the recovery command.

Figure 3:
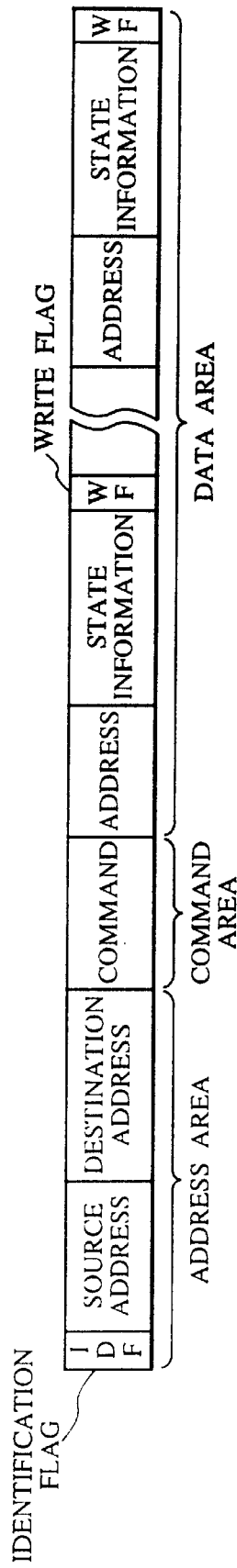
FIG. 3 is a view showing a configuration of a recovery command identified by a source address.

FIG. 3 shows a configuration of the recovery command identified by a source address. The recovery command shown in FIG. 3 comprises an address area, a command area, and a data area. The address area includes a source address having an identification flag IDF indicating that this command is the recovery command, and a destination address. The command area includes a command. The data area includes a plurality of information areas each of which has a set of its own address, state information, and a write flag WF.

The write flag WF has been reset at initial state and then set at the time when the state information and own address are written. If the write flag WF is set, writing of corresponding state information and own address is inhibited to thus prevent overwriting.

In the case shown in FIG. 3, when the transmitting/receiving I/F 11-1 to 11-n receive the recovery command, they decode the identification flag IDF added to the source address of the recovery command to identify that the data is the recovery command.

In this manner, it can be identified based on the source address whether or not the received data is the recovery command. Identification of the recovery command is not limited to the case where the identification flag is employed. The recovery command may be identified only when the source address indicates a particular source.

Figure 2:
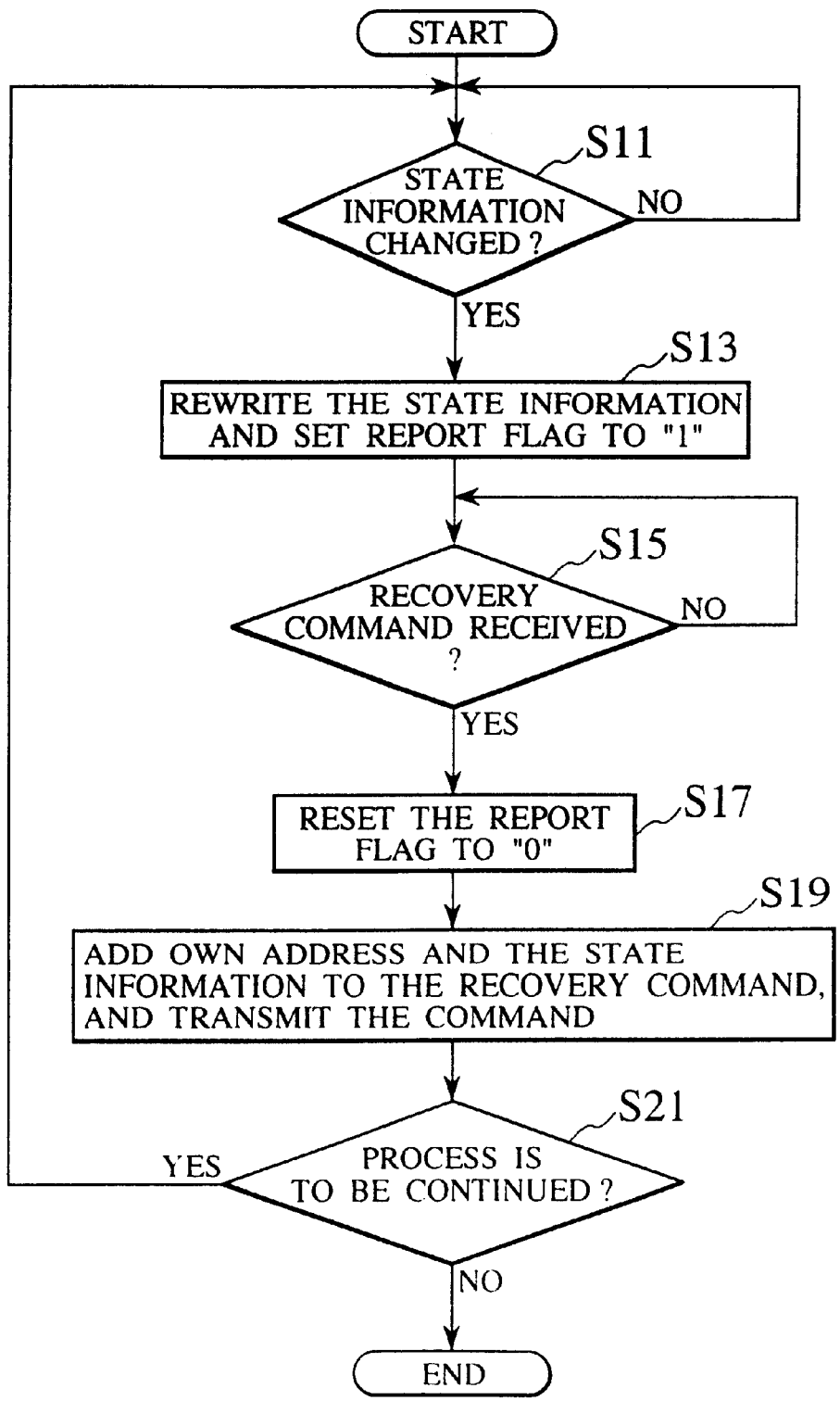
FIG. 2 is a flowchart showing a state information managing method which can be achieved by the communication system according to the embodiment of the present invention.

Next, a state information managing method which can be achieved by the communication system constructed as above will be explained with reference to a flowchart shown in FIG. 2.

First, in the communication unit 1-1, the state monitoring portion 7-1 decides whether or not the state information in the functional block portion 5-1 has been changed (step S11).

Then, if the state information has been changed, the state monitoring portion 7-1 rewrites the state information stored in the state information memory 9-1 and also sets the report flag RF added to the state information memory 9-1 to "1" (step S13).

Next, when receives the data, the transmitting/receiving I/F 11-1 decides whether or not the data is the recovery command (step S15). Here, if the identification flag IDF is included in the source address shown in FIG. 3, the received data can be identified as the recovery command.

Then, if the data is the recovery command and also the report flag stored in the information memory 9-1 is "1", the transmitting/receiving I/F 11-1 resets the report flag RF to "0" (step S17).

The transmitting/receiving I/F 11-1 writes its own address and the state information into the first information area of the data area of the recovery command not to overwrite them, then sets the corresponding write flag WF, and then transmits the recovery command to the communication unit 1-3 (step S19). Finally, it is decided whether or not the process is to be continued (step S21). If the process is to be continued, the process returns to step S11.

In contrast, the transmitting/receiving I/F 11-3 of the communication unit 1-3 receives the recovery command from the communication unit 1-1. In the communication unit 1-3, the processes are carried out in accordance with the flowchart shown in FIG. 2. If the state information has been changed, the processes from step S11 to step S19 are executed in the communication unit 1-3. In other words, the transmitting/receiving I/F 11-3 writes its own address and the state information into the second information area of the data area of the recovery command not to overwrite them, then sets the corresponding write flag WF, and then transmits the recovery command to the communication unit 1-4.

In the same way as above, the recovery command is transmitted in the order of the communication units 1-5, 1-6, . . . , 1-n. If the state information have been changed in respective communication units, the transmitting/receiving I/Fs write their own addresses and the state information into the information areas of the data area of the recovery command not to overwrite them, then set the write flags WF, and then transmit the recovery command to the succeeding communication unit.

Then, if the state information has been changed in the last communication unit 1-n, the transmitting/receiving I/F 11-n writes its own address and the state information into the last information areas of the data area of the recovery command not to overwrite them, then sets the write flags WF, and then transmit the recovery command shown in FIG. 3 to the communication unit 1-2 serving as the collection destination.

Meanwhile, in the communication unit 1-2, the transmitting/receiving I/F 11-2 receives the recovery command from the communication unit 1-n, and stores respective state information in the received recovery command into the state information memory 9-2.

Like the above, when the state information has been changed in respective communication units, the state information in the state information memories are rewritten and the report flags are set. In addition, when the recovery command is received, the report flag is reset, then its own address and the state information are added to the recovery command, and then they are transmitted.

In other words, without the communication of the state request and the state response transmitted from respective communication units individually, states of respective communication units can be grasped by the collection destination by transmitting the recovery command only once. Therefore, the communication traffic volume can be reduced.

Moreover, without the situation that the state reports are generated simultaneously from a plurality of communication units, the state information included in the recovery command in respective communication units can be transmitted to the communication unit 1-2 by transmitting the recovery command only once from the last communication unit 1-n. Therefore, collision of the state information from respective communication units can be avoided.

Furthermore, if only the state information in the communication units whose report flags are set to "1" are added to the recovery command and then recovered, a recovery time can be reduced shorter than the case where the state information in all the communication units are to be recovered.

Figure 4:
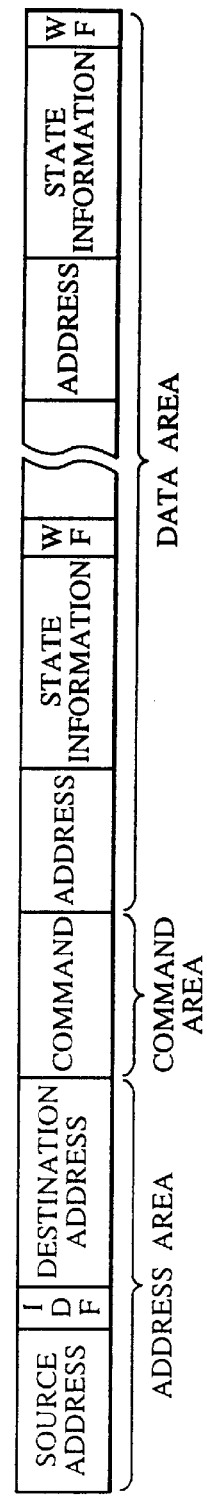
FIG. 4 is a view showing a configuration of a recovery command identified by a destination address.

FIG. 4 shows a configuration of the recovery command identified by the destination address. The recovery command shown in FIG. 4 comprises an address area, a command area, and a data area. The address area includes a source address, and a destination address having an identification flag IDF indicating that this command is the recovery command. The command area includes a command. The data area includes a plurality of information areas each of which has a set of its own address, state information, and a write flag WF.

In this case, when the transmitting/receiving I/Fs 11-1 to 11-n receive the recovery command, they can identify that the data is the recovery command, by decoding the identification flag IDF added to the destination address of the recovery command.

In this fashion, it can be identified by the destination address whether or not the received data is the recovery command. Identification of the recovery command is not limited to the case where the identification flag is employed. The recovery command may be identified only when the destination address indicates a particular destination.

Figure 5:
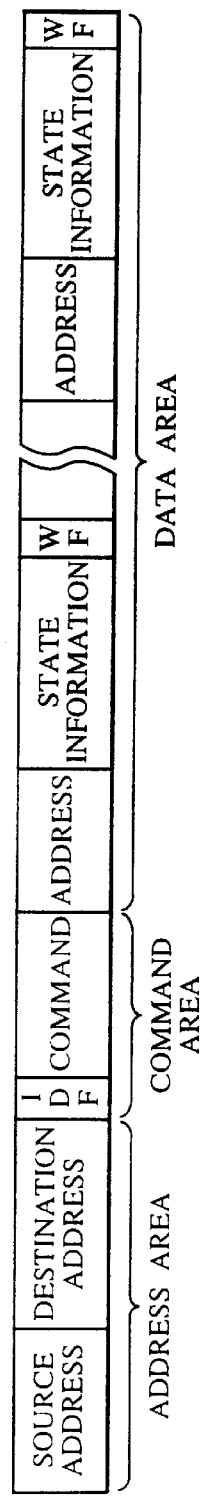
FIG. 5 is a view showing a configuration of a recovery command identified by a command.

FIG. 5 shows a configuration of the recovery command identified by a command. In FIG. 5, the address area includes a source address, and a destination address. The command area includes a command having an identification flag IDF indicating that this command is the recovery command. The data area includes a plurality of information areas each of which has a set of its own address, state information, and a write flag WF.

In this event, when the transmitting/receiving I/Fs 11-1 to 11-n receive the recovery command, they can identify that the data is the recovery command, by decoding the identification flag IDF added to the command of the recovery command.

In this way, it can be identified by the command whether or not the received data is the recovery command. Identification of the recovery command is not limited to the case where the identification flag is employed. The recovery command may be identified only when the command indicates a predetermined command.

Although the communication unit 1-2 has been designated as the collection destination in the above embodiment, any one of other communication units 1-1, 1-3 to 1-n may be employed as the collection destination.

According to the present invention, in respective report communication units, the state information of their own communication units are stored into the memory portion, then it is monitored whether or not the state information have been changed, then the state information stored in the memory portions are rewritten into the changed state information when the state information have been changed, and then the state information and their own addresses after the change are added to the recovery command to be transmitted when they receive the recovery command.

Then, if the state information and their own addresses after change associated with all report communication units are added to the recovery command, the collecting communication unit can receive the recovery command to which the state information and their own addresses in respective report communication units after the change are added collectively.

In other words, since the collecting communication unit can acquire the state information of respective report communication units by receiving the recovery command only once, the communication traffic volume can be reduced and also collision of the state information sent out from respective report communication units can be avoided.

Besides, the report flag is set when the state information has been changed and the report flag is reset when the state information and the their own addresses after the change are added to the recovery command, so that it can be grasped whether or not the state information after the change have been recovered.

Still further, it can be decided based on any one of the source address, the destination address, and the command whether or not the received data is the recovery command, and also the state information and their own addresses after the change are added to the recovery command to be transmitted if the received data is the recovery command and the report flag has been set. Therefore, only the changed state information in only the report communication units in which the state information have been changed can be transmitted.

It should be understood that many modifications and adaptations of the invention will become apparent to those skilled in the art and it is intended to encompass such obvious modifications and changes in the scope of the claims appended hereto.

What is claimed is:

1. A method of managing state information of a communications system having a bus to which a plurality of communication units are connected, said plurality of communication units including a designated collecting unit and a plurality of interconnected reporting units, said method comprising:

monitoring, within each reporting unit, state information of a respective reporting unit and when a change of state information occurs, overwriting previous state information stored in a memory portion of each respective reporting unit with current state information;

transmitting a single recovery command from the collecting unit to a first one of said plurality of reporting units;

within said first reporting unit, adding respective current state information to said recovery command and re-transmitting the recovery command with said added respective current state information to successive reporting units;

within each successive reporting unit, cumulatively adding respective current state information to the recovery command received from a previous reporting unit and re-transmitting the recovery command with said added respective current state information to another successive reporting unit;

in said collecting unit, receiving said recovery command having said cumulatively added current state information from a last one of said successive reporting units.

2. The method of claim 1, further comprising:

at each reporting unit, setting a report flag within the memory portion when the change of state information occurs in the respective reporting unit, wherein each reporting unit cumulatively adds current state information to said recovery command only if the report flag has been set; and at each reporting unit resetting said report flag after said step of cumulatively adding within the respective reporting unit.

3. The method of claim 2, further comprising:

at each reporting unit, re-transmitting said recovery command without adding current state information when said report flag has not been set in the respective reporting unit.

4. The method of claim 1, wherein the recovery command includes a source address, a destination address, a command, and state information, and said modifying step further comprises deciding, based on any one of the source address, the destination address, and the command, whether or not received data is the recovery command.

5. A communication system having a bus to which a plurality of communication units are connected, said plurality of communication units including a designated collecting unit and a plurality of interconnected reporting units, wherein each of said reporting units comprises:

a memory portion configured to store state information of a respective reporting unit, a state monitoring portion configured to monitor the state information of said respective reporting unit, and to overwrite state information previously stored in said memory portion with current state information when a change in state information occurs, and a first transmitting/receiving portion configured to receive a recovery command, to add said current state information to said recovery command, and to re-transmit the recovery command to successive reporting units with said added respective current state information; and said designated collecting unit comprises:

a second transmitting/receiving portion configured to transmit a single recovery command to a first one of said plurality of reporting units and to receive the recovery command from a last one of said successive reporting units after the current state information of each reporting unit is cumulatively added to said recovery command.

6. The system of claim 5, wherein said state monitoring portion is further configured to set a report flag within the memory portion when the change of state information occurs in the respective reporting unit, and said first transmitting/receiving portion is configured to cumulatively add said current state information to said recovery command only if the report flag has been set, and to reset said report flag after cumulatively adding said current state information.

7. The system of claim 6, wherein said first transmitting/receiving portion is further configured to re-transmit said recovery command without adding current sate information when said report flag has not been set.

8. The system of claim 5, wherein the recovery command includes a source address, a destination address, a command, and state information, and the first transmitting/receiving portion is configured to decide based on any one of the source address, the destination address, and the command, whether or not received data is the recovery command.

* * * * *

UNITED STATES PATENT AND TRADEMARK OFFICE
CERTIFICATE OF CORRECTION

PATENT NO.     : 6,243,830 B1                                    Page 1 of 1
DATED          : June 5, 2001
INVENTOR(S)    : Yoshinori Nakatsugawa It is certified that error appears in the above-identified patent and that said Letters Patent is hereby corrected as shown below:

<u>Column 1,</u>
Line 9, delete "a" after "reduce".
Line 26, delete "transmits" and insert -- transmit --.
Line 38, delete "request" and insert -- requests --.

<u>Column 2,</u>
Line 9, delete "request" and insert -- requests --.

<u>Column 3,</u>
Lines 27 and 29, delete "have" and insert -- has --.

<u>Column 6,</u>
Line 1, insert -- it before "receives".
Line 32, delete "," after "...".
Line 32, delete "have" and insert -- has --.
Line 44, delete "transmit" and insert -- transmits --.

<u>Column 7,</u>
Lines 60 and 62, delete "have" and insert -- has --.

<u>Column 8,</u>
Line 14, delete "the" before "their own".
Lines 16 and 27, delete "have" and insert -- has --.
Lines 51-52 and 57-58, delete "with said added respective current state information" before "to another".

<u>Column 10,</u>
Line 1, delete "with" and insert -- ; and --.

Signed and Sealed this

Nineteenth Day of February, 2002

Attest:

*Attesting Officer*

JAMES E. ROGAN
*Director of the United States Patent and Trademark Office*